United States Patent [19]
Bennett

[11] Patent Number: 4,593,465
[45] Date of Patent: Jun. 10, 1986

[54] ROTARY NIBBLER

[76] Inventor: Brian A. Bennett, 53 Morphett Rd., Camden Park, State of South Australia, Australia

[21] Appl. No.: 669,454

[22] Filed: Nov. 7, 1984

[30] Foreign Application Priority Data

Nov. 9, 1983 [AU] Australia .............................. PG2308

[51] Int. Cl.$^4$ ............................................. B23D 27/02
[52] U.S. Cl. ...................................... 30/240; 30/265; 30/228; 83/596; 83/916; 83/350
[58] Field of Search ................. 30/264, 240, 228, 233; 83/916, 350, 596

[56] References Cited

U.S. PATENT DOCUMENTS

| | | | |
|---|---|---|---|
| 3,143,911 | 8/1964 | Dickerson | 83/350 |
| 3,618,611 | 11/1971 | Urban | 30/240 X |
| 4,074,603 | 2/1978 | Bengtsson | 83/916 X |
| 4,249,309 | 2/1981 | Karr | 30/240 |
| 4,312,610 | 1/1982 | Burt | 83/916 X |

*Primary Examiner*—Donald R. Schran
*Attorney, Agent, or Firm*—Henry Sternberg; Bert J. Lewen

[57] ABSTRACT

A rotary type nibbler comprising a spindle having a helical groove, the spindle being rotatable in a bearing sleeve which terminates in a flat workpiece engagement face which is at an angle with respect to the axis of rotation approximating the helix angle of the groove so that the edge of a workpiece when urged into engagement with the root of the groove will have cut from it a crescent shaped slug.

13 Claims, 8 Drawing Figures

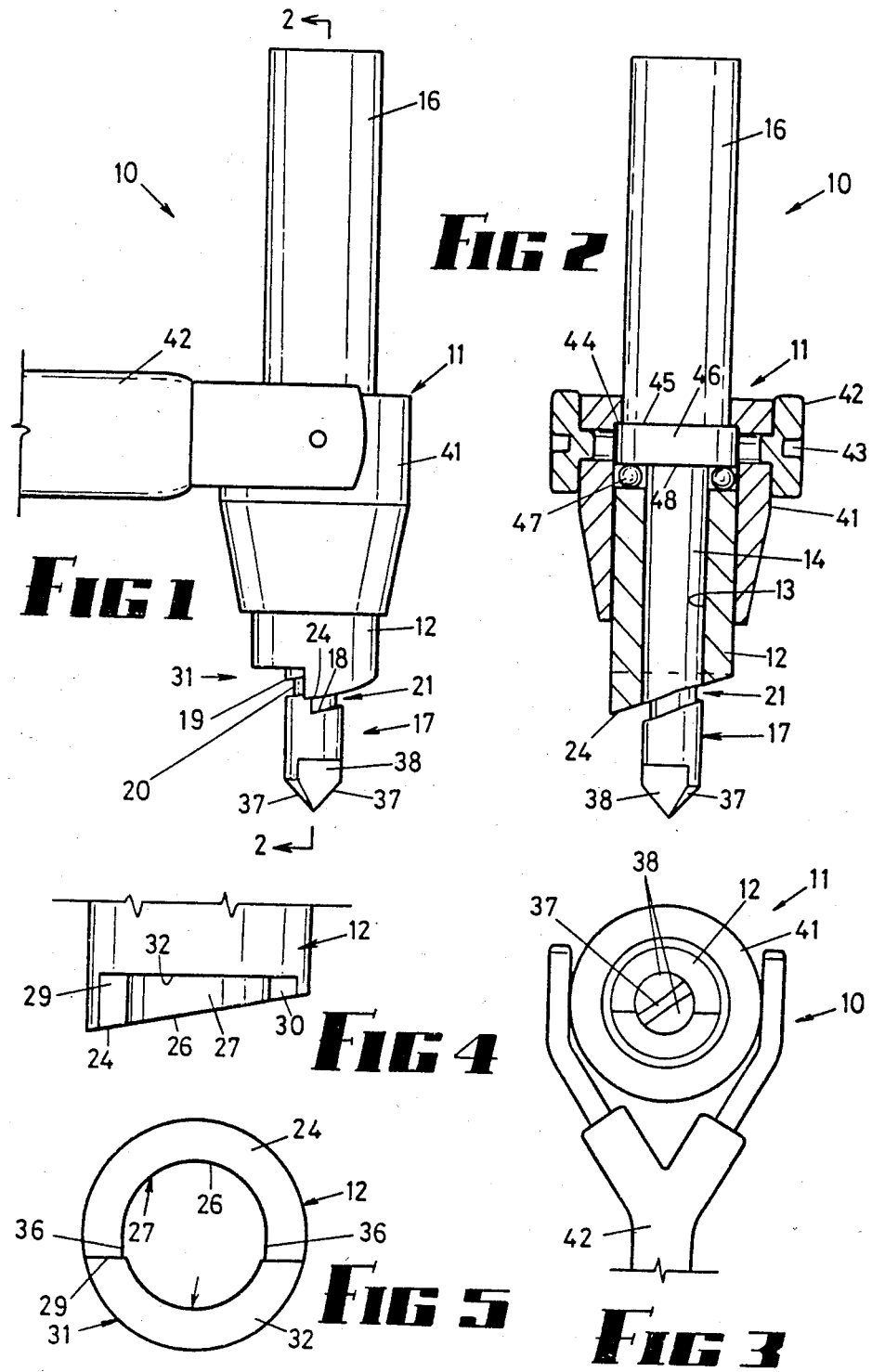

ROTARY NIBBLER

This invention relates to a nibbling device which functions in a rotary manner.

BACKGROUND OF THE INVENTION

For the cutting of sheet metal or other sheet material, use is commonly made of a machine known as a "nibbler", having one fixed blade and one reciprocating blade, the reciprocating blade co-operating with the fixed blade in a guillotine like manner, and the machine is moved over a work piece so as to create a single shear line. In other nibblers, there are parallel shear lines and a small strip is removed from the workpiece.

A data bank search revealed the following U.S. specifications Nos:

3,143,911 Dickerson
4,074,603 Bengtsson
4,312,610 Burt, and
4,249,309 Karr.

Of those specifications, reference is particularly made to the Dickerson U.S. Pat. No. 3,143,911 and the Bengtsson U.S. Pat. No. 4,074,603. The closest art to the present invention known to the applicant is the Dickerson U.S. Pat. No. 3,143,911 wherein the nibbler body was constituted by a single start helical thread which was arranged to urge an edge of a workpiece against a sharpened bushing edge of a flat workpiece receiving face at right angles to the axis of rotation of the thread.

One of the difficulties encountered with devices of that type is that the thickness of the workpiece is necessarily much less than the gap between the outstanding webs of the thread so that the workpiece can be urged against the roof of the thread, the surface which defines the helical groove bearing downwardly on the upper surface of the workpiece progressively upon rotation but since the workpiece is not inclined at the helix angle there is essentially some impact and consequential deflection of the workpiece.

BRIEF SUMMARY OF THE INVENTION

With the object of providing a more effective nibbler of a rotary type, in this invention there is provided a spindle having a helical groove, the spindle being rotatable in a bearing sleeve which terminates in a flat workpiece engagement face which is at an angle with respect to the axis of rotation approximating the helix angle of the groove so that the edge of a workpiece when urged into engagement with the root of the groove will have cut from it a crescent shaped slug.

More specifically, the invention consists of a spindle carried in said bearing sleeves for rotation within the body about a central axis a first end of the spindle having a drive engagement surface adjacent one end of the body, a second end of the spindle projecting from the other end of the body and having surfaces defining a helical groove in the side wall of the spindle, one of said groove surfaces defining, with that side wall, a helical cutting edge, the bearing sleeve also having a flat workpiece engagement face which defines, with the axis of rotation, an angle which approximates the helix angle of the groove, the bearing sleeve having a curved surface contiguous with said spindle side wall and opening to the workpiece engagement face, defining therewith a cutting edge fixed with respect to the body and co-operable with said helical cutting edge upon rotation of the spindle.

By inclining a workpiece with respect to the axis, the width of the groove can be minimal (for example, only about 20% greater than the workpiece thickness) and this is found to be of considerable importance in achieving a simple operation of the nibbler. There is minimum width of the web which exists between overlapping portions of the groove which, if not maintained, will result in overheating of the web and consequentially loss of temper. However, if the groove is narrow, the helix angle can be quite considerable, in the order of 79° and this also assists in providing a small inclination with an acceptably low wear rate.

Since portable electric drills are in very common use it is clearly desirable that a rotary nibbler should be capable of being used in conjunction with a portable electric drill and in an embodiment of the invention the spindle projects from one end of the body so that the spindle surface itself is a drive engagement surface which can be gripped in the chuck of an electric drill, although other drive engagement surfaces may be used, (for example, the flat surfaces of a central hexagonal socket in the end of the spindle.)

When a rotary nibbler is used the slugs are of crescent shape and shearing of the slugs is a matter of some importance. It is desirable to avoid having the slugs carried through a bushing (as in Dickerson) and in an embodiment of this invention the sleeve curved surface has its cutting edge extend around the spindle for more than 180°, but less than 360° and terminates at its ends in rebate surfaces between which a slug ejection recess is defined in the side of a sleeve.

Desirably, the curved surface terminates at its ends in surfaces spaced away from the spindle side wall, for example parallel surfaces which resist ingress of metal dust into the running space between sleeve curved surface and the spindle.

BRIEF DESCRIPTION OF THE DRAWINGS

An embodiment of the invention is described hereunder in some detail with reference to and is illustrated in the accompanying drawings in which
FIG. 1 is a side elevation of a rotary nibbler,
FIG. 2 is a section taken on line 2—2 of FIG. 1,
FIG. 3 is an underside view of FIG. 2,
FIG. 4 is a fragmentary side elevation which particularly shows the slug ejection recess of the sleeve,
FIG. 5 is an underside view of FIG. 4.

Figure 6:
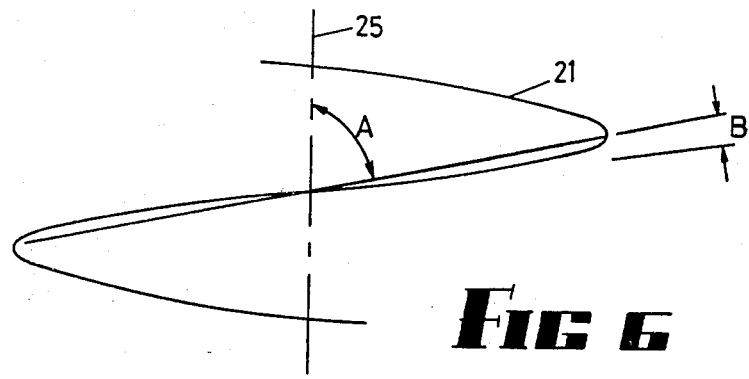
FIG. 6 is a drawing which illustrates diagrammatically the relationship between the helical cutting edge of the spindle and the flat workpiece engagement face.

DETAILED DESCRIPTION OF A PREFERRED EMBODIMENT.

In FIG. 1 a rotary nibbler 10 comprises a body 11, the body 11 having therein a bearing sleeve 12 the inner surface 13 of which is bearing surface and the bearing surface journals for rotation the spindle 14.

The spindle 14 comprises a first end 16 which projects from one end of the body and which comprises a drive engagement surface adjacent that end of the body since the end 16 can be gripped by the chuck of a portable electric drill.

Figure 8:
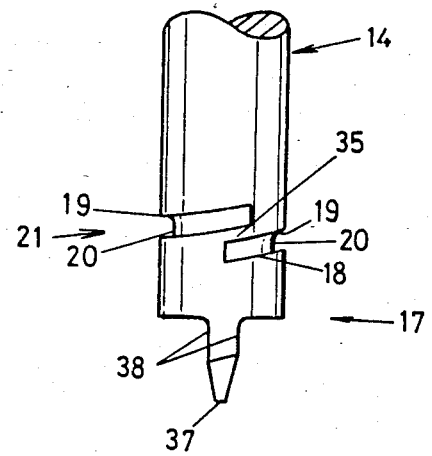
FIG. 8 is a fragmentary elevation of an end of the spindle, which shows the groove shape

The second end of the spindle 14 projects from the other end of the body 11 and has a lower groove surface 18, an upper groove surface 19 and a groove root surface 20, which between them define a helical groove 21 (shown in detail in FIG. 8, and diagrammatically in FIG. 6), the helical groove 21 extending for more than 370° around the spindle 24 but less than 425° and the ends of the groove "run out" or merge into the side wall of the spindle 14.

Figure 7:
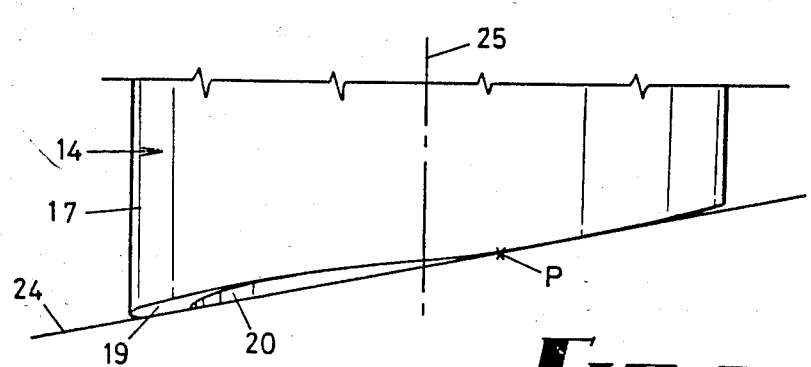
FIG. 7 is a view showing that relationship at a stage during the cutting of a slug from a workpiece.

The outer end of the bearing sleeve 12 terminates in a flat workpiece engagement face 14 which as shown in FIG. 6 defines with the axis of rotation 25 an angle which is slightly less than the helix angle A of the groove by the small angle B which is itself less than 10°, such that the workpiece engagement face 24 approximates the helix angle A. However as can be seen by the enlarged view in FIG. 7, this arrangement provides a means whereby shearing of a workpiece takes place progressively as the intersection point P moves across the workpiece P, being the intersection between the upper groove surface 19 of the groove 21 and the cutting edge 26 which is defined between the workpiece engagement face and a curved surface 27 which is itself an extension of the upper surface 13 of the sleeve 12.

As seen best in FIG. 5, the cutting edge 26 extends around the curved surface of the second end 17 of spindle 14 by an amount exceeding 180° but less than 360°, and this together with the curved surface 27 terminates at its ends in rebate surfaces 29 and 30 which define a rebate 31 the inner end surface of which is the surface 32. This rebate then allows the crescent shaped slugs which are cut from the edge of a workpiece to be transported, by rotation of spindle 14, circularly around within the space defined by curved surface 27, and to be rejected from rebate 31. In this respect it may be noted that it is desirable to drive the spindle at about 2000 rpm, and the device will function satisfactorily at speeds up to 5000 rpm.

In the embodiment shown, the second end 17 of the spindle 14 is about ¼" (6 mm) diameter and the depth of the groove 21 is about 1 mm. The axial length of the groove 21 is slightly in excess of 1 mm but is made as narrow as possible so that the thickness of the web 35 is as much as possible, since in operation the web 35 is likely to overheat. This overheating will be aggravated if any build up of metal dust occurs between curved surface 26 and spindle end 17 and in this respect the ends of curved surface 26 where they open to rebate surfaces 29 and 30 are shaped to provide two flat parallel portions 36 as shown in FIG. 5. The extreme end of spindle 14 is provided with converging drill cutting edges 37 flanked on each side by flat relief surfaces 38 (or other drill configuration) so that a hole can first be drilled in a workpiece and then the nibbler can be progressed from that hole.

As seen best in FIGS. 1, 2 and 3, the body 11 also comprises a carrier 41 to which is pivotted a handle 42 by pivot means 43, and which facilitates control of the nibbler when used as a portable drill. The carrier 41 has a radially inwardly directed retaining surface 44 and this engages the upper annular second shoulder surface 45 of a radially outstanding annular flange 46 on the spindle 14 between ends 16 and 17. The plurality of balls 47 constitute a thrust bearing between the inner end of bearing sleeve 12 and a first shoulder 48 of the flange 46.

There are several aspects of design which are of importance.

Firstly, it is desirable that the helix angle should be as close to 90° as possible and in this embodiment it is approximately 79°. While the helix angle can be increased by increasing spindle diameter, other difficulties are encountered and for the most sheet metal work the above dimensions will be found to be an excellent compromise. If the helix angle varies very much from the stated 79°, there will be a tendency for the tool to "wander" and be difficult to guide. This same tendency will occur if the workpiece engagement face 24 is at an angle exceeding the helix angle A, and it is very desirable that it should be slightly less as described above. It is also desirable that some lubricant should be inserted in the running space between the lower ends of the spindle 14 and the bearing sleeve 12.

If the above precautions are observed, 24 gauge mild steel can be cut at the rate of about 2 metres per minute. It should be noted that the spindle 14 is best produced from a steel which is capable of being hardened and tempered, one particular steel being ASSAB DF 2 (ASSAB being the trade mark of Assab Steels Pty. Ltd., 683 Burke Road, Camberwell, Victoria, Australia). If this is hardened and tempered in accordance with instructions, it will retain about 4% Austenite. Alternatively high speed steel may be used.

The body is a tough steel which will accept a nitride case hardening without danger of fracturing of the case as might occur with certain other less tough steels.

In most instances, cutting can be effected without the use of coolant liquid, although it is desirable to lubricate regularly (desirably after every metre of cut).

I claim:

1. A rotary nibbler comprising a body, a bearing sleeve in the body having a bearing surface, a spindle carried in said bearing sleeve for rotation within the body about a central axis, a first end of the spindle having a drive engagement surface adjacent one end of the body, a second end of the spindle projecting from the other end of the body and having surfaces defining a helical groove in the side wall of the spindle, one of said groove surfaces defining, with that side wall, a helical cutting edge, the bearing sleeve also having a flat workpiece engagement face which defines, with the axis of rotation, an angle which approximates the helix angle of the groove, the bearing sleeve having a curved surface contiguous with said spindle side wall and opening to the workpiece engagement face, defining therewith a cutting edge fixed with respect to the body and co-operable with said helical cutting edge upon rotation of the spindle.

2. A rotary nibbler according to claim 1 wherein said first end of the spindle projects from said one end of the body.

3. A rotary nibbler according to claim 1 wherein said sleeve curved surface is an extension of said bearing surface.

4. A rotary nibbler according to claim 1 wherein said helical groove extends around the spindle more than 360°.

5. A rotary nibbler according to claim 1 or claim 2 wherein said helical groove extends around the spindle between 370° and 425°, and defines a dividing web between overlapping portions of the groove.

6. A rotary nibbler according to claim 1 wherein said sleeve curved surface and cutting edge extend around the spindle for more than 180° but less than 360°, and terminates at its ends in rebate surfaces between which a slug ejection recess is defined in the side of the sleeve.

7. A rotary nibbler according to claim 6 wherein said sleeve curved surface terminates at its ends in surfaces which are spaced away from said spindle side wall.

8. A rotary nibbler according to claim 1 wherein said angle defined between the workpiece engagement face and the groove helix angle is less than said helix angle.

9. A rotary nibbler according to claim 8 wherein the difference between the first and second angles defined therein is less than 10°.

10. A rotary nibbler according to claim 1 wherein said body further comprises an outer carrier which contains said sleeve, said spindle having a shoulder surface within said carrier, and thrust bearing means between the shoulder surface and an end of the bearing sleeve.

11. A rotary nibbler according to claim 10 wherein said spindle comprises a radially outstanding annular flange intermediate its ends, said shoulder surface being a surface of said flange, said flange having a second shoulder surface, and said carrier having an annular radially inwardly directed retaining surface which constrains the spindle against displacement in an axial direction.

12. A rotary nibbler according to claim 10 further comprising a handle, and pivot means joining the handle to the carrier.

13. A rotary nibbler according to claim 1 wherein said spindle second end terminates in converging drill cutting edges flanked by relief surfaces which extend part way along the spindle.

* * * * *